(12) United States Patent
Xu et al.

(10) Patent No.: US 11,943,689 B2
(45) Date of Patent: Mar. 26, 2024

(54) INTENT-BASED NETWORK CONFIGURATION METHOD, APPARATUS, AND SYSTEM

(71) Applicant: HUAWEI TECHNOLOGIES CO., LTD., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 17/488,776

(22) Filed: Sep. 29, 2021

(65) Prior Publication Data

US 2022/0022015 A1 Jan. 20, 2022

Related U.S. Application Data

(63) Continuation of application No. PCT/CN2020/081396, filed on Mar. 26, 2020.

(30) Foreign Application Priority Data

Apr. 1, 2019 (CN) .......................... 201910258314.4

(51) Int. Cl.
*H04W 88/18* (2009.01)
*H04W 4/029* (2018.01)
*H04W 4/50* (2018.01)

(52) U.S. Cl.
CPC ............. *H04W 4/50* (2018.02); *H04W 4/029* (2018.02); *H04W 88/18* (2013.01)

(58) Field of Classification Search
CPC ................................ H04W 4/50; H04W 88/18
See application file for complete search history.

(56) References Cited

U.S. PATENT DOCUMENTS 8,184,641 B2    5/2012   Alt et al.
2007/0019623 A1 1/2007   Alt et al.
(Continued)

FOREIGN PATENT DOCUMENTS

CN      1688133 A   10/2005
CN    101945008 A    1/2011
(Continued)

OTHER PUBLICATIONS

3GPP TR 28.812 V0.4.0, 3rd Generation Partnership Project; Technical Specification Group Services and System Aspects; Telecommunication management; Study on scenarios for Intent driven management services for mobile networks(Release 16), Mar. 15, 2019, 24 pages.
(Continued)

*Primary Examiner* — Michael T Vu
(74) *Attorney, Agent, or Firm* — Rimon PC

(57) ABSTRACT

A network configuration method includes receiving, by an intent management device, a service intent from a requirement device, where the service intent indicates service requirement information, and the service requirement information includes service access time information of at least one terminal device and service access location information of the at least one terminal device. The method further includes determining network configuration information based on the service intent and configuring a network based on the network configuration information. Alternatively, the method may include determining first information based on the service intent and sending the first information to a network management device. The first information includes network configuration information or network intent information. The network configuration information indicates a radio resource configuration, and the network intent information describes an effect of a network configuration.

19 Claims, 7 Drawing Sheets

(56) References Cited

U.S. PATENT DOCUMENTS

2017/0135099 A1* 5/2017 Song ................. H04W 76/25
2020/0104881 A1* 4/2020 Yasui ................. G06Q 30/0266

FOREIGN PATENT DOCUMENTS

| CN | 102857836 A | 1/2013 |
| CN | 106851655 A | 6/2017 |
| CN | 109314696 A | 2/2019 |

OTHER PUBLICATIONS

Aklamanu Fred et al: "Intent-Based Real-Time 5G Cloud Service Provisioning"; 2018 IEEE Globecom Workshops; Dec. 9, 2018; pp. 1-6; XP033519264.

* cited by examiner

INTENT-BASED NETWORK CONFIGURATION METHOD, APPARATUS, AND SYSTEM

CROSS-REFERENCE TO RELATED APPLICATIONS

This application is a continuation of International Patent Application No. PCT/CN2020/081396, filed on Mar. 26, 2020, which claims priority to Chinese Patent Application No. 201910258314.4, filed on Apr. 1, 2019. The disclosures of the aforementioned applications are hereby incorporated by reference in their entireties.

TECHNICAL FIELD

Embodiments of this application relate to the communication field, and in particular, to an intent-based network configuration method, an apparatus, and a system.

BACKGROUND

An ultra-reliable low-latency communication (URLLC) service, for example, a real-time flight control service of an unmanned aerial vehicle and a high-definition video backhaul service of the unmanned aerial vehicle, is introduced into a 5th generation (the 5th generation, $5G^{th}$) communication system. The URLLC service is highly dynamic and has a higher requirement on a network in terms of real-time dynamic adjustment. Therefore, to facilitate real-time adjustment of a URLLC service, an operator generally deploys a slice instance (network) in an area to support different URLLC services.

Generally, a network management device may allocate a network resource to a URLLC service of a terminal device based on a service subscription request of the terminal device. Once the network resource is allocated to a corresponding service, even if the terminal device does not have the corresponding service at some moments, the corresponding resource is reserved. As a result, network resources are wasted.

SUMMARY

Embodiments of this application provide an intent-based network configuration method, an apparatus, and a system, to implement a pay-per-use network resource scheduling mode, so that a network resource is properly used, and waste of network resources can be avoided.

To achieve the foregoing objective, the following technical solutions are used in the embodiments of this application.

According to a first aspect, an intent-based network configuration method is disclosed. The method includes: receiving, by an intent management device, a service intent from a requirement device, where the service intent is used to indicate service requirement information, and the service requirement information includes service access time information of at least one terminal device and service access location information of the at least one terminal device; determining, by the intent management device, network configuration information based on the service intent, and configuring a network based on the network configuration information; or determining, by the intent management device, first information based on the service intent, and sending the first information to a network management device, where the first information comprises network configuration information or network intent information. It should be noted that the network configuration information is used to indicate a radio resource configuration, and the network intent information is used to describe an effect of a network configuration.

In the method provided in some embodiments of the present application, the intent management device can allocate a network resource to a service of a terminal device based on the service access time information and the service access location information in the service requirement information, and a user only needs to pay for the network resource during the service access time, thereby implementing a pay-per-use network resource scheduling mode. In addition, outside the service access time, the network resource may be allocated to another service, so that the network resource is efficiently used and network resources are not wasted.

With reference to the first aspect, in a first possible implementation of the first aspect, the service access time information includes at least one of the following information: service access start time information, service access end time information, a service access periodicity, and service access duration.

In the method provided in some embodiments of the present application, the intent management device can learn of an actual service access time of the user based on the service access start time information, the service access end time information, the service access periodicity, or the service access duration, and further allocate a radio resource used during the service access time to a service of the user. The user only needs to pay for traffic generated by the service used during the service access time.

With reference to the first aspect or the first possible implementation of the first aspect, in a second possible implementation of the first aspect, the service access location information includes longitude and latitude information and/or service access area information that are/is related to a service access path.

In the method provided in some embodiments of the present application, the intent management device can learn of an actual service access area of the user based on the longitude and latitude information and/or the service access area information that are/is related to the service access path, and further allocate a radio resource used in the service access area to the service of the user. The user only needs to pay for traffic generated by the service used in the service access area.

With reference to the first aspect or the first possible implementation or the second possible implementation of the first aspect, in a third possible implementation of the first aspect, the service intent includes at least one of the following: service type information, tenant information, an identifier of the terminal device, a quantity of terminal devices, and a service intent priority.

In the method provided in some embodiments of the present application, the intent management device can properly allocate a radio resource to the service of the user based on the service type information, the tenant information, the identifier of the terminal device, the quantity of terminal devices, or the service intent priority.

With reference to the first aspect or the first possible implementation to the third possible implementation of the first aspect, in a fourth possible implementation of the first aspect, the network configuration information includes at least one of the following: antenna configuration information, beam configuration information, cell configuration information, routing information, and status information of a network device, where the status information of the network device includes any one of an active state, an inactive state, an available state, and an unavailable state.

In the method provided in some embodiments of the present application, the intent management device can configure the network based on the antenna configuration information, the beam configuration information, the cell configuration information, the routing information, and the status information of the network device, to support a service requested by the user by using the service intent. For example, an antenna direction, a beam direction, a beam power, and the like may be adjusted based on the antenna configuration information.

With reference to the first aspect or the first possible implementation to the fourth possible implementation of the first aspect, in a fifth possible implementation of the first aspect, the method further includes: sending, by the intent management device, a service intent template to the requirement device, where the service intent template is used to indicate at least one of format information of the service intent and constraint information of the service intent, the format information of the service intent is used to indicate the service requirement information supported by the service intent, and the constraint information of the service intent is used to indicate a range of the service requirement information supported by the service intent.

In the method provided in some embodiments of the present application, the intent management device sends the service intent template to the requirement device, so that the intent management device can provide a corresponding service intent based on the service requirement information and the constraint information in the service intent template, and configure the network based on the service intent, to support the service of the user.

With reference to the fifth possible implementation of the first aspect, in a sixth possible implementation of the first aspect, before the sending, by the intent management device, a service intent template to the requirement device, the method further includes: receiving, by the intent management device, a service subscription request message, where the service subscription request message includes at least one of a service type, a user rate, a latency, and a maximum quantity of users; and determining, by the intent management device, the service intent template based on the service subscription request message.

In the method provided in some embodiments of the present application, after receiving the service subscription request message of the requirement device, the intent management device may not allocate the network resource to the service of the user, but determine a service intent template of the service used by the user. In this way, the requirement device can report the service access time and the service access area of the user based on the service intent template, and the intent management device can further configure the network based on an actual service requirement of the user, thereby avoiding waste of network resources.

With reference to the sixth possible implementation of the first aspect, in a seventh possible implementation of the first aspect, the service subscription request message further includes second information, where the second information is used to indicate the intent management device to return the service intent template.

In the method provided in some embodiments of the present application, the second information in the service subscription request message can explicitly indicate that after receiving the service subscription request message, the intent management device first does not allocate the network resource to the service of the user, but determines the service intent template of the service used by the user.

With reference to the first aspect or the first possible implementation to the seventh possible implementation of the first aspect, in an eighth possible implementation of the first aspect, the method further includes: sending, by the intent management device, an interface invocation address to the requirement device, where the interface invocation address is used to indicate the requirement device to send the service intent to the intent management device by using the interface invocation address.

In the method provided in some embodiments of the present application, the intent management device sends the interface invocation address to the requirement device, so that the requirement device can send the service intent to the intent management device, and the intent management device can allocate the network resource to the service of the user based on the service intent.

According to a second aspect, an intent-based network configuration method is disclosed. The method includes: generating, by a requirement device, a service intent based on a service intent template, where the service intent is used to indicate service requirement information, and the service requirement information includes service access time information of at least one terminal device and service access location information of the at least one terminal device; and sending, by the requirement device, the service intent to an intent management device, to indicate the intent management device to configure a network based on the service intent.

With reference to the second aspect, in a first possible implementation of the second aspect, the service access time information includes at least one of the following: service access start time information, service access end time information, a service access periodicity, and service access duration.

With reference to the second aspect or the first possible implementation of the second aspect, in a second possible implementation of the second aspect, the service access location information includes longitude and latitude information and/or service access area information that are/is related to a service access path.

With reference to the second aspect or the first possible implementation or the second possible implementation of the second aspect, in a third possible implementation of the second aspect, the service intent includes at least one of the following: service type information, tenant information, an identifier of a terminal device, a quantity of terminal devices, and a service intent priority.

With reference to any one of the second aspect or the first possible implementation to the third possible implementation of the second aspect, in a fourth possible implementation of the second aspect, network configuration information includes at least one of the following: antenna configuration information, beam configuration information, cell configuration information, routing information, and status information of a network device, where the status information of the network device includes any one of an active state, an inactive state, an available state, and an unavailable state.

With reference to any one of the second aspect or the first possible implementation to the fourth possible implementation of the second aspect, in a fifth possible implementation of the second aspect, the method further includes: receiving the service intent template from the intent management device, where the service intent template is used to indicate at least one of format information of the service intent and constraint information of the service intent, the format information of the service intent is used to indicate the service requirement information supported by the service intent, and the constraint information of the service intent is used to indicate a range of the service requirement information supported by the service intent.

With reference to the fifth possible implementation of the second aspect, in a sixth possible implementation of the second aspect, before the receiving the service intent template from the intent management device, the method further includes: sending a service subscription request message to the intent management device, to indicate the intent management device to determine the service intent template based on the service subscription request message, where the service subscription request message includes at least one of a service type, a user rate, a latency, and a maximum quantity of users.

With reference to the sixth possible implementation of the second aspect, in a seventh possible implementation of the second aspect, the service subscription request message further includes second information, where the second information is used to indicate the intent management device to return the service intent template.

With reference to any one of the second aspect or the first possible implementation to the seventh possible implementation of the second aspect, in an eighth possible implementation of the second aspect, the method further includes: receiving an interface invocation address from the intent management device, where the interface invocation address is used to indicate the requirement device to send the service intent to the intent management device by using the interface invocation address.

According to a third aspect, an intent management device is disclosed. The intent management device includes: a communication unit, configured to receive a service intent from a requirement device, where the service intent is used to indicate service requirement information, and the service requirement information includes service access time information of at least one terminal device and service access location information of the at least one terminal device; and a processing unit, configured to: determine network configuration information based on the service intent, and configure a network based on the network configuration information; or the communication unit is further configured to: determine first information based on the service intent, and send the first information to a network management device, where the first information includes network configuration information or network intent information, the network configuration information is used to indicate a radio resource configuration, and the network intent information is used to describe an effect of a network configuration.

With reference to the third aspect, in a first possible implementation of the third aspect, the service access time information includes at least one of the following: service access start time information, service access end time information, a service access periodicity, and service access duration.

With reference to the third aspect or the first possible implementation of the third aspect, in a second possible implementation of the third aspect, the service access location information includes longitude and latitude information and/or service access area information that are/is related to a service access path.

With reference to the third aspect or the first possible implementation or the second possible implementation of the third aspect, in a third possible implementation of the third aspect, the service intent includes at least one of the following: service type information, tenant information, an identifier of a terminal device, a quantity of terminal devices, and a service intent priority.

With reference to any one of the third aspect or the first possible implementation to the third possible implementation of the third aspect, in a fourth possible implementation of the third aspect, the network configuration information includes at least one of the following: antenna configuration information, beam configuration information, cell configuration information, routing information, and status information of a network device, where the status information of the network device includes any one of an active state, an inactive state, an available state, and an unavailable state.

With reference to any one of the third aspect or the first possible implementation to the fourth possible implementation of the third aspect, in a fifth possible implementation of the third aspect, the communication unit is further configured to send a service intent template to the requirement device, where the service intent template is used to indicate at least one of format information of the service intent and constraint information of the service intent, the format information of the service intent is used to indicate the service requirement information supported by the service intent, and the constraint information of the service intent is used to indicate a range of the service requirement information supported by the service intent.

With reference to the fifth possible implementation of the third aspect, in a sixth possible implementation of the third aspect, the communication unit is further configured to: before sending the service intent template to the requirement device, receive a service subscription request message, where the service subscription request message includes at least one of a service type, a user rate, a latency, and a maximum quantity of users;

the processing unit is further configured to determine the service intent template based on the service subscription request message.

With reference to the sixth possible implementation of the third aspect, in a seventh possible implementation of the third aspect, the service subscription request message further includes second information, where the second information is used to indicate the intent management device to return the service intent template.

With reference to any one of the third aspect or the first possible implementation to the seventh possible implementation of the third aspect, in an eighth possible implementation of the third aspect, the communication unit is further configured to send an interface invocation address to the requirement device, where the interface invocation address is used to indicate the requirement device to send the service intent to the intent management device by using the interface invocation address.

According to a fourth aspect, a requirement device is disclosed. The requirement device includes: a processing unit, configured to generate a service intent based on a service intent template, where the service intent is used to indicate service requirement information, and the service requirement information includes service access time information of at least one terminal device and service access location information of the at least one terminal device; and a communication unit, configured to send the service intent to an intent management device, to indicate the intent management device to configure a network based on the service intent.

With reference to the fourth aspect, in a first possible implementation of the fourth aspect, the service access time information includes at least one of the following: service access start time information, service access end time information, a service access periodicity, and service access duration.

With reference to the fourth aspect or the first possible implementation of the fourth aspect, in a second possible implementation of the fourth aspect, the service access location information includes longitude and latitude information and/or service access area information that are/is related to a service access path.

With reference to the fourth aspect or the first possible implementation or the second possible implementation of the fourth aspect, in a third possible implementation of the fourth aspect, the service intent includes at least one of the following: service type information, tenant information, an identifier of a terminal device, a quantity of terminal devices, and a service intent priority.

With reference to the fourth aspect or the first possible implementation to the third possible implementation of the fourth aspect, in a fourth possible implementation of the fourth aspect, network configuration information includes at least one of the following: antenna configuration information, beam configuration information, cell configuration information, routing information, and status information of a network device, where the status information of the network device includes any one of an active state, an inactive state, an available state, and an unavailable state.

With reference to the fourth aspect or the first possible implementation to the fourth possible implementation of the fourth aspect, in a fifth possible implementation of the fourth aspect, the communication unit is further configured to receive a service intent template from an intent management device, where the service intent template is used to indicate at least one of format information of the service intent and constraint information of the service intent, the format information of the service intent is used to indicate the service requirement information supported by the service intent, and the constraint information of the service intent is used to indicate a range of the service requirement information supported by the service intent.

With reference to the fifth possible implementation of the fourth aspect, in a sixth possible implementation of the fourth aspect, the communication unit is further configured to: before receiving the service intent template from the intent management device, send a service subscription request message to the intent management device, to indicate the intent management device to determine the service intent template based on the service subscription request message, where the service subscription request message includes at least one of a service type, a user rate, a latency, and a maximum quantity of users.

With reference to the sixth possible implementation of the fourth aspect, in a seventh possible implementation of the fourth aspect, the service subscription request message further includes second information, where the second information is used to indicate the intent management device to return the service intent template.

With reference to the fourth aspect or the first possible implementation to the seventh possible implementation of the fourth aspect, in an eighth possible implementation of the fourth aspect, the communication unit is further configured to: receive an interface invocation address from the intent management device, where the interface invocation address is used to indicate the requirement device to send the service intent to the intent management device by using the interface invocation address.

According to a fifth aspect, an intent processing system is disclosed. The system includes a requirement device, an intent management device, and a network management device. The requirement device is configured to: generate a service intent based on a service intent template, and send the service intent to the intent management device, where the service intent is used to indicate service requirement information, and the service requirement information includes service access time information of at least one terminal device and service access location information of the at least one terminal device. The intent management device is configured to: receive the service intent from the requirement device, determine network configuration information based on the service intent, and configure a network based on the network configuration information; or receive the service intent from the requirement device, determine first information based on the service intent, and send the first information to the network management device, where the first information includes network configuration information or network intent information. It should be noted that the network configuration information is used to indicate a radio resource configuration, and the network intent information is used to describe an effect of a network configuration.

According to a sixth aspect, an intent management device is disclosed. The intent management device includes a memory, a processor, and a program that is stored in the memory and that can be run on the processor, where when the processor executes the program, the intent-based network configuration method according to any one of the first aspect or the possible implementations of the first aspect is implemented.

According to a seventh aspect, a requirement device is disclosed. The requirement device includes a memory, a processor, and a program that is stored in the memory and that can be run on the processor, where when the processor executes the program, the intent-based network configuration method according to any one of the second aspect or the possible implementations of the second aspect is implemented.

According to an eighth aspect, an intent processing system is disclosed. The intent processing system includes the intent management device according to any one of the third aspect or the possible implementations of the third aspect and the requirement device according to any one of the fourth aspect or the possible implementations of the fourth aspect.

According to a ninth aspect, a computer-readable storage medium is disclosed. The computer-readable storage medium includes instructions, where when the instructions are run on a computer, the computer is enabled to perform the intent-based network configuration method according to any one of the first aspect or the possible implementations of the first aspect and the intent-based network configuration method according to any one of the second aspect or the possible implementations of the second aspect.

According to a tenth aspect, a computer program product is disclosed. The computer program product includes instructions, where when the instructions are run on a computer, the computer is enabled to perform the intent-based network configuration method according to any one of the first aspect or the possible implementations of the first aspect and the intent-based network configuration method according to any one of the second aspect or the possible implementations of the second aspect.

According to an eleventh aspect, a wireless communication apparatus is disclosed. The wireless communication apparatus stores instructions, where when the wireless communication apparatus runs on the apparatus according to any one of the third aspect or the possible implementations of the third aspect and the apparatus according to any one of the fourth aspect or the possible implementations of the fourth aspect, the apparatuses are enabled to perform the intent-based network configuration method according to any one of the first aspect or the possible implementations of the first aspect and the intent-based network configuration method according to any one of the second aspect or the possible implementations of the second aspect. The wireless communication apparatus is a chip.

DESCRIPTION OF EMBODIMENTS

Figure 1:
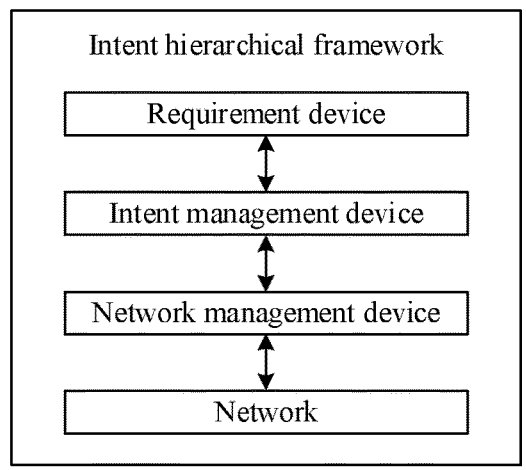
FIG. 1 is a schematic diagram of an intent hierarchical framework according to an embodiment of this application.

The following describes the technical solutions in the embodiments of this application with reference to the accompanying drawings in the embodiments of this application. In the descriptions of this application, "/" indicates an "or" relationship between associated objects unless otherwise specified. For example, A/B may indicate A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more unless otherwise specified. "At least one item (piece) of the following" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

Before the solutions of this application are described, terms in this application are first explained.

(1) A service intent is used to describe a service requirement of a terminal device. For example, the service intent may be used to describe a service requirement of an unmanned aerial vehicle from a location A to a location B, a video backhaul service requirement of the unmanned aerial vehicle in a flight process, and the like.

(2) Network intent information is used to describe a network requirement, that is, an effect that needs to be achieved during network configuration. For example, if a current network does not support a service intent, a network intent may be generated to express a requirement on the network. An operation such as extending a network range or narrowing a network range may be included.

(3) A network management device is configured to: provide and manage a network, provide a service, and manage the provided service.

(4) A requirement device is a device that uses a network or a service. The requirement device may propose a service intent based on a service requirement of a terminal device, and describe, by using the service intent, a service used by the terminal device.

For example, the requirement device provides a service for an unmanned aerial vehicle enterprise user, and the requirement device may send a service intent to an intent management device based on a service requirement of the unmanned aerial vehicle user, to provide the service for the unmanned aerial vehicle user.

(5) An intent management device is configured to configure, based on an intent proposed by a requirement device, a network or a service used by the requirement device. The intent management device may alternatively request a network management device to configure a corresponding network.

Alternatively, the intent management device may determine a network intent based on a service intent proposed by a requirement device, and transfer the network intent to a network management device, so that the network management device configures a corresponding network based on the network intent.

It should be noted that the intent management device may be independently deployed from a network provider device, or may be deployed in a network provider device. This is not specifically limited in the embodiments of this application.

It should be noted that the foregoing devices may be function units, may be chip systems, or other devices. This is not specifically limited in the embodiments of this application.

An intent-based network configuration method provided in the embodiments of this application may be applied to an intent hierarchical framework shown in FIG. 1. As shown in FIG. 1, the intent hierarchical framework includes a requirement device, an intent management device, a network management device, and a network.

An interface between the requirement device and the intent management device is mainly used by the intent management device to receive a service subscription request and a service intent that are sent by the requirement device. An interface between the intent management device and the network management device is mainly used by the network management device to receive a network management request or a network device management request sent by the intent management device, for example, to request the network management device to modify a network configuration, to request the network management device to activate a network device, and to request the network management device to manage a life cycle of the network device. The management of the life cycle of the network device by the network management device may be creating a virtual machine on the network device, deleting a virtual machine deployed on the network device, modifying a virtual machine deployed on the network device, or the like.

It should be noted that the requirement device may be a communication service consumer (CSC), and may provide a communication service for a terminal device. For example, the requirement device may be a device on which a user operation system is deployed. For example, the requirement device may provide an operation support for an unmanned aerial vehicle user, and may propose a service intent based on a service requirement of the unmanned aerial vehicle user, to implement a service of the unmanned aerial vehicle user based on the service intent.

The intent management device may be a communication service provider (CSP), may provide a communication service for the requirement device, and is responsible for operation of the communication service, including management of a life cycle of the communication service, and the like. The intent management device may further convert a corresponding communication service requirement into a network requirement. For example, after receiving a service intent of the requirement device, the service intent may be converted into a network intent. For example, the service intent transferred by the requirement device is: An unmanned aerial vehicle A uses a service "from a school B to a school C", and if the intent management device determines that a network that can be used cannot satisfy a flight mission of the unmanned aerial vehicle A, a network intent "extending a range of the network that can be used by the intent management device" is transferred to the network management device. Alternatively, the service intent transferred by the requirement device is: An unmanned aerial vehicle A uses a service "from a school B to a school C", the intent management device converts the service intent into a network intent "a network slice of unmanned aerial vehicle flight is enabled in an area A", and sends the network intent to the network management device.

The network management device may be a device of a network operator (NOP), provides a network, including a sliced network, a non-sliced network, and a non-public network, for the intent management device, and is mainly responsible for management of a life cycle of the network.

The network device is managed by a network element provider (NEP). The NEP provides the network device for the NOP, and is also responsible for management of a life cycle of a sub-network, management of a life cycle of a network element, and the like.

In a current technology, the intent management device may allocate a network resource to a service of the terminal device based on a service subscription request message. Once the network resource is allocated to a corresponding service, even if the terminal device does not have the corresponding service at some moments, the corresponding resource is reserved. As a result, a waste of network resources is caused. For example, a maximum quantity of users in the service subscription request message is 100, and the intent management device reserves network resources to support services of the 100 terminal devices. Actually, some of the terminal devices may not always have a service requirement, and the waste of network resources is caused.

An embodiment of the present application provides an intent-based network configuration method. An intent management device receives a service intent sent by a requirement device. The service intent is used to indicate service requirement information, and the service requirement information includes service access time information of at least one terminal device and service access location information of the at least one terminal device. Further, the intent management device configures a corresponding network based on the service intent, or indicates the network management device to configure a corresponding network. In some embodiments of the present application, the intent management device may allocate a network resource to a service of the terminal device based on the service access time information and the service access location information in the service requirement information, and a user only needs to pay for the network resource in a service access time, thereby implementing a pay-per-use network resource scheduling mode. In addition, in a period other than the service access time, the network resource may be allocated to another service, so that the network resource is properly used and network resources are not wasted.

It should be noted that the intent management device or the requirement device in some embodiments of the present application may be implemented by one device, or may be jointly implemented by a plurality of devices, or may be a function module in a device, or may be a chip in a device. This is not specifically limited in this embodiment of this application. It may be understood that the foregoing functions may be network elements in a hardware device, or may be software functions running on special-purpose hardware, or may be virtualization functions instantiated on a platform (for example, a cloud platform).

Figure 2:
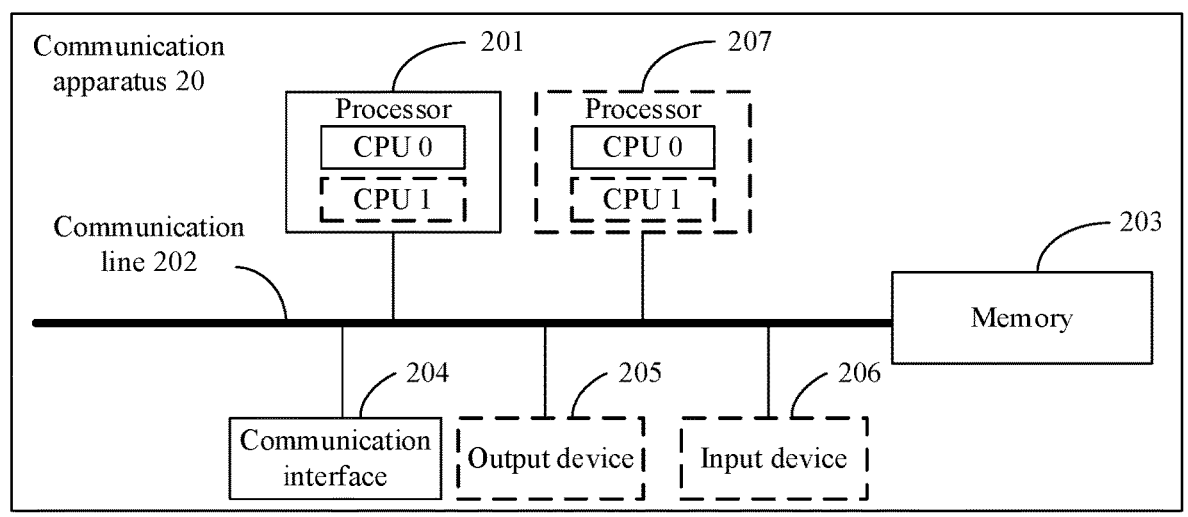
FIG. 2 is a structural block diagram of an apparatus according to an embodiment of this application.

For example, the intent management device or the requirement device in some embodiments of the present application may be implemented by using a communication apparatus 20 in FIG. 2. FIG. 2 is a schematic diagram of a hardware structure of the communication apparatus 20 according to an embodiment of this application. The communication apparatus 20 includes a processor 201, a communication line 202, a memory 203, and at least one communication interface (where descriptions are provided in FIG. 2 merely by using an example in which the communication apparatus 20 includes the communication interface 204).

The processor 201 may be a general-purpose central processing unit (CPU), a microprocessor, an application-specific integrated circuit (ASIC), or one or more integrated circuits that are configured to control execution of a program in the solutions of this application.

The communication line 202 may include a path for transmitting information between the foregoing components.

The communication interface 204 uses any apparatus such as a transceiver, to communicate with another device or a communication network, for example, the Ethernet, a radio access network (RAN), or a wireless local area network (WLAN).

The memory 203 may be a read-only memory (ROM) or another type of static storage device capable of storing static information and instructions, or a random access memory (RAM) or another type of dynamic storage device capable of storing information and instructions, or may be an electrically erasable programmable read-only memory (EE- PROM), a compact disc read-only memory (CD-ROM) or another compact disc storage, optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or a data structure and capable of being accessed by a computer, but is not limited thereto. The memory may exist independently, and is connected to the processor through the communication line 202. The memory may alternatively be integrated with the processor.

The memory 203 is configured to store computer-executable instructions for executing the solutions of this application, and the processor 201 controls the execution. The processor 201 is configured to execute the computer-executable instructions stored in the memory 203, to implement the intent-based network configuration method provided in the following embodiments of this application.

Optionally, the computer-executable instructions in some embodiments of this application may also be referred to as application program code. This is not specifically limited in some embodiments of this application.

During specific implementation, in an embodiment, the processor 201 may include one or more CPUs, for example, a CPU 0 and a CPU 1 in FIG. 2.

During specific implementation, in an embodiment, the communication apparatus 20 may include a plurality of processors, for example, the processor 201 and a processor 207 in FIG. 2. Each of these processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the communication apparatus 20 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector (projector). The input device 206 communicates with the processor 201, and may receive input from a user in a plurality of manners. For example, the input device 206 may be a mouse, a keyboard, a touchscreen device, or a sensing device.

The foregoing communication apparatus 20 may be a general-purpose device or a special-purpose device. During specific implementation, the communication apparatus 20 may be a desktop computer, a portable computer, a network server, a palmtop computer (PDA), a mobile phone, a tablet computer, a wireless terminal device, an embedded device, or a device having a structure similar to that in FIG. 2. A type of the communication apparatus 20 is not limited in this embodiment of this application.

In a possible implementation, when the communication apparatus 20 is used as the intent management device in an embodiment of the present application, the processor 201 of the communication apparatus 20 runs or executes a software program and/or a module that are/is stored in the memory 203, and invokes data stored in the memory 203, to perform the following functions.

The intent management device receives a service intent sent by a requirement device, where the service intent includes service requirement information such as service access time information and service access location information. The intent management device may determine network configuration information based on the service intent, and further, the intent management device may configure a network based on the network configuration information, to support a service of a terminal device. Alternatively, the intent management device may send network configuration information to a network management device, to indicate the network management device to configure a network based on the network configuration information. Certainly, the intent management device may further generate network intent information based on the service intent, and transfer the network intent information to the network management device, and the network management device may configure the network based on the network intent information.

In a possible implementation, when the communication apparatus 20 is used as the requirement device in an embodiment of the present disclosure, the processor 201 runs or executes a software program and/or a module that are/is stored in the memory 203, and invokes data stored in the memory 203, to perform the following functions.

The requirement device receives a service intent template sent by an intent management device, where the service intent template is used to indicate at least one of format information of a service intent and constraint information of the service intent. The format information of the service intent is used to indicate service requirement information supported by the service intent, and the constraint information of the service intent is used to indicate a range of the service requirement information supported by the service intent. The requirement device may further generate the service intent based on a service requirement of a terminal device and with reference to the intent template, and send the generated service intent to the intent management device, to allocate a network resource to a service of the terminal device.

The following describes in detail the solutions provided in the embodiments of this application with reference to accompanying drawings.

It should be noted that, in the following embodiments of this application, names of messages or names of parameters in messages between devices are merely examples, and the messages or the parameters may have other names in specific implementations. This is not specifically limited in the embodiments of this application.

Figure 3:
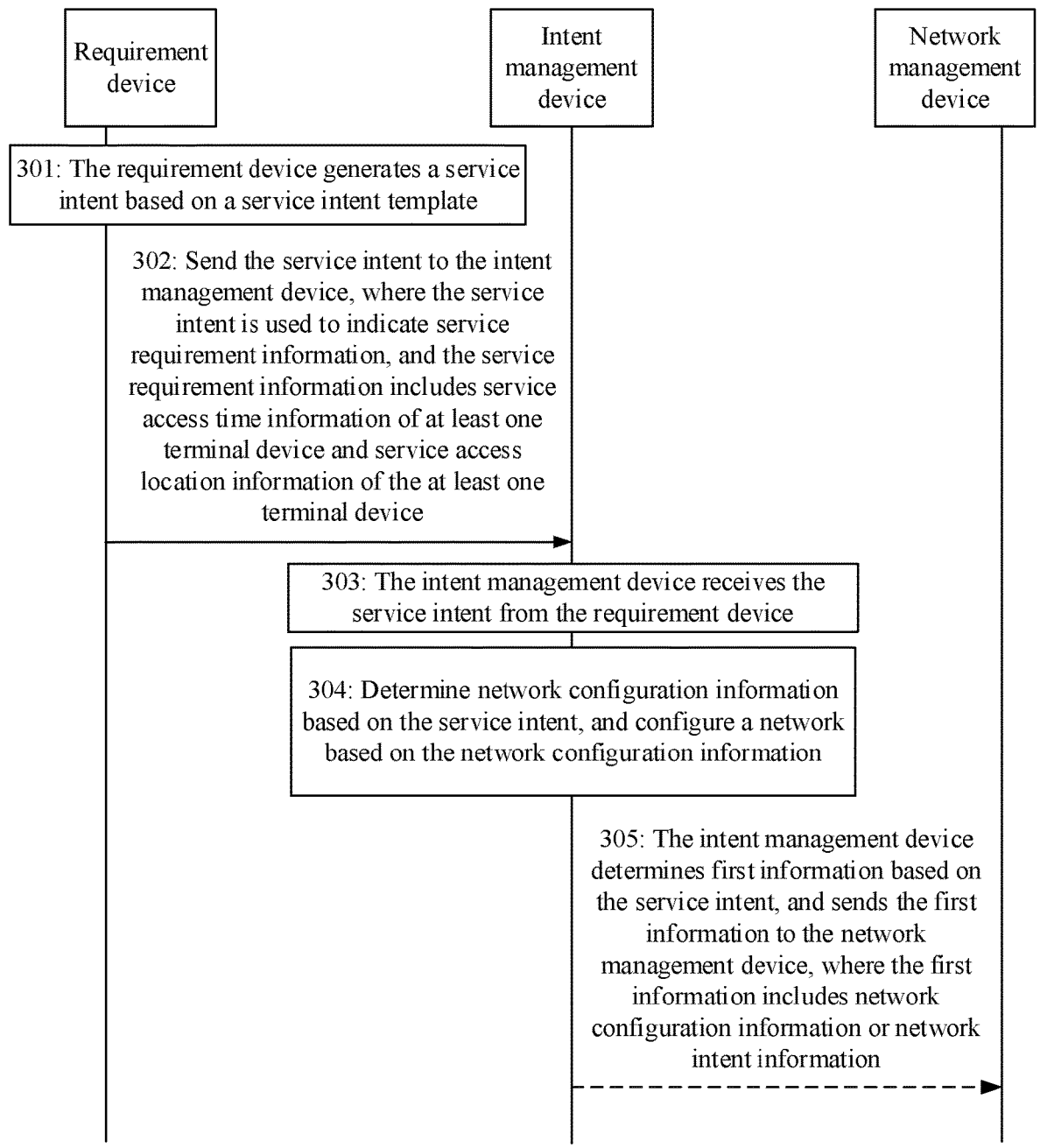
FIG. 3 is a schematic flowchart of an intent-based network configuration method according to an embodiment of the present application.

An embodiment of the present application provides an intent-based network configuration method. As shown in FIG. 3, the method includes the following steps.

301: A requirement device generates a service intent based on a service intent template.

It should be noted that the service intent template is used to indicate at least one of format information of the service intent and constraint information of the service intent. The format information of the service intent is used to indicate service requirement information supported by the service intent. For example, the service requirement information indicated by the format information of the service intent may be service access time information, service access location information, service type information, tenant information, an identifier of a terminal device, a quantity of terminal devices, and a service intent priority.

The following describes the service requirement information with reference to examples.

(1) The service access time information is used to indicate duration of a service described in the service intent. In a possible implementation, the service access time information includes at least one of the following:

service access start time information, service access end time information, a service access periodicity, and service access duration.

For example, service access time information in a service intent template of an unmanned aerial vehicle service may be a start time of the unmanned aerial vehicle service, for example, 2019.4.1.13:00. The service access time information may alternatively be an end time of the unmanned aerial vehicle service, for example, 2019.4.1.16:00. The service access time information may alternatively be duration of the unmanned aerial vehicle service, for example, 4 hours. The service access time information may alternatively be an access periodicity of the unmanned aerial vehicle service, for example, a flight service is used every two hours.

(2) The service access location information is used to indicate a geographical range related to the service described in the service intent. In a possible implementation, the service access location information includes at least one of longitude and latitude information and service access area information that are/is related to a service access path.

The longitude and latitude information related to the service access path may constitute longitude and latitude information of each node of the service access path, or may be longitude and latitude information of a start point of the service access path and longitude and latitude information of an end point of the service access path.

For example, a flight mission of the unmanned aerial vehicle service is from a school A to a school B, passing through building D. The longitude and latitude information related to the service access path may be longitude and latitude information of the school A, longitude and latitude information of the school B, and longitude and latitude information of the building D. The longitude and latitude information related to the service access path may alternatively be longitude and latitude information of the school A and longitude and latitude information of the school B.

The service access area information is used to indicate an area related to a service of the terminal device. For example, if a flight mission of the unmanned aerial vehicle service is performed in Haidian District, Beijing, the service access area information may be used to indicate "Haidian District, Beijing".

(3) The service type information is used to indicate a type of the service described in the service intent. For example, the type of the service indicated by the service type information may be an unmanned aerial vehicle service, an augmented reality (AR) service, a virtual reality (VR) service, or the like.

(4) The tenant information is used to indicate a tenant (tenant) of the service described in the service intent. The tenant may be understood as an enterprise user, and the tenant information may be information about the enterprise user. For example, an unmanned aerial vehicle belongs to a tenant, the unmanned aerial vehicle may use a service provided by a network, and the tenant information may be information about an unmanned aerial vehicle enterprise user.

(5) The identifier of the terminal device is used to indicate a terminal device that uses the service described in the service intent.

(6) The quantity of terminal devices is used to indicate a quantity of terminal devices that use the service described in the service intent.

(7) The service intent priority is used to indicate a priority of the service intent. The higher the priority of the service intent, a network resource is preferentially allocated to the service intent. Service intent templates of the same type of services can have different priorities.

In addition, the constraint information of the service intent is used to indicate a range of the service requirement information supported by the service intent, and constraint information that is of the service intent and that corresponds to service requirement information is used to indicate a range of the service requirement information. For example, constraint information corresponding to the service access time information may be used to indicate a range of a service access time. For example, the service access time does not exceed two hours.

Figure 4:
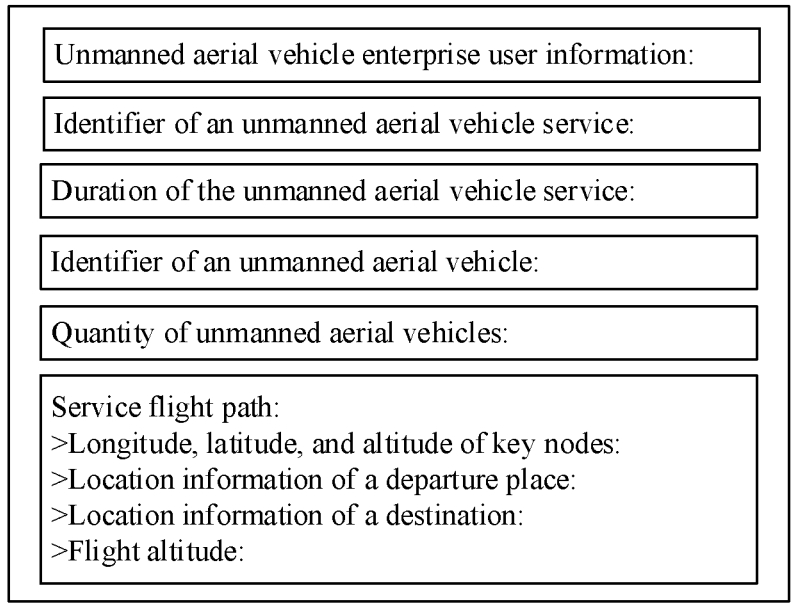
FIG. 4 is a schematic diagram of a service intent template according to an embodiment of the present application.

FIG. 4 shows a possible service intent template. The service intent template shown in FIG. 4 is applicable to the unmanned aerial vehicle service. Specifically, the service requirement information included in the service intent template may be unmanned aerial vehicle enterprise user information, an identifier of the unmanned aerial vehicle service, duration of the unmanned aerial vehicle service, an identifier of the unmanned aerial vehicle, a quantity of unmanned aerial vehicles, and a service flight path. The unmanned aerial vehicle enterprise user information is the tenant information, and is used to indicate an enterprise user that uses the unmanned aerial vehicle service. The identifier of the unmanned aerial vehicle service is used to indicate that the service intent template is for the unmanned aerial vehicle service. The duration of the unmanned aerial vehicle service is the service access time information, the identifier of the unmanned aerial vehicle is the identifier of the terminal device, and the service flight path is the service access location information.

Specifically, the service flight path may include longitude, latitude, and altitude of key nodes in the flight path. These key nodes may be nodes constituting the flight path.

The service flight path may further include location information of a departure place of unmanned aerial vehicle flight, location information of a destination of the unmanned aerial vehicle flight, and flight altitude.

Figure 5:
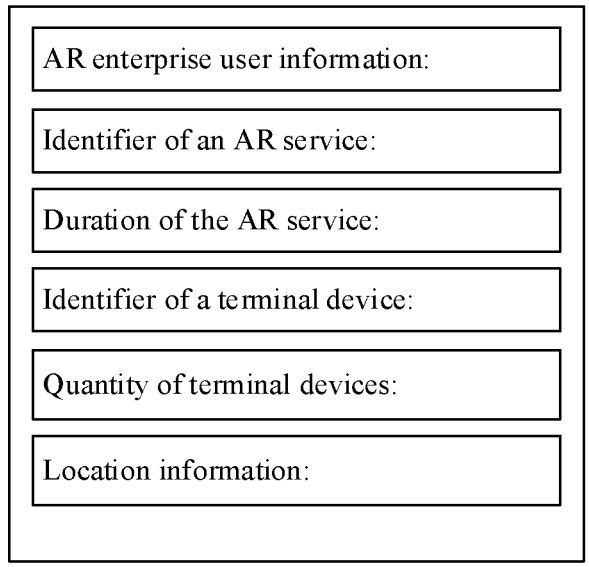
FIG. 5 is another schematic diagram of a service intent template according to an embodiment of the present application.

FIG. 5 shows a possible service intent template. The service intent template shown in FIG. 5 is applicable to an AR service or a VR service. Specifically, the service requirement information included in the service intent template may be AR enterprise user information, an identifier of the AR service (an identifier of the VR service), duration of the AR service, a quantity of terminal devices, an identifier of a terminal device, and location information. The location information may be information about an area in the AR service or the VR service. For example, the "location information" may be area information of a library, area information of an administrative area, or the like.

The identifier of the VR service in the service intent template is used to indicate that the service intent template is for the VR service. The identifier of the AR service in the service intent template is used to indicate that the service intent template is for the AR service.

Figure 6:
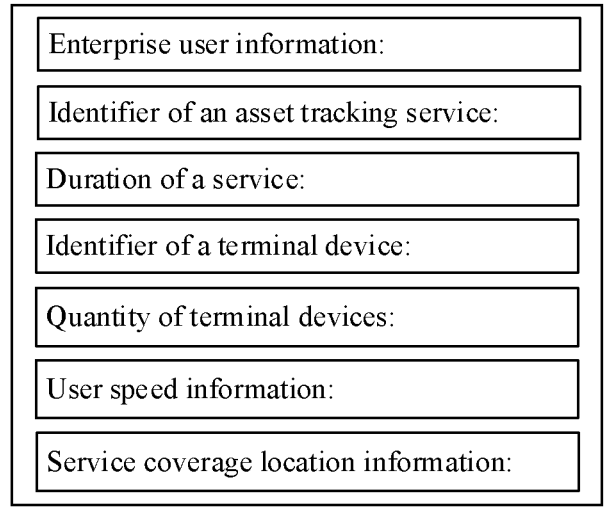
FIG. 6 is another schematic diagram of a service intent template according to an embodiment of the present application.

FIG. 6 shows a possible service intent template. The service intent template shown in FIG. 6 is applicable to an asset tracking (asset tracking) service. Specifically, the service requirement information included in the service intent template may be enterprise user information, an identifier of the asset tracking service, duration of the service, a quantity of terminal devices, an identifier of a terminal device, user speed information, and service coverage location information. The user speed information is moving speed information of the terminal device, for example, a low speed, a normal speed, or a fast speed.

After obtaining the service intent template, the intent management device may determine a specific value of each piece of service requirement information in the service intent template based on a service requirement and with reference to the constraint information of the service requirement information. The service intent generated by the intent management device may include the specific value of each piece of service requirement information in the service intent template.

Figure 7:
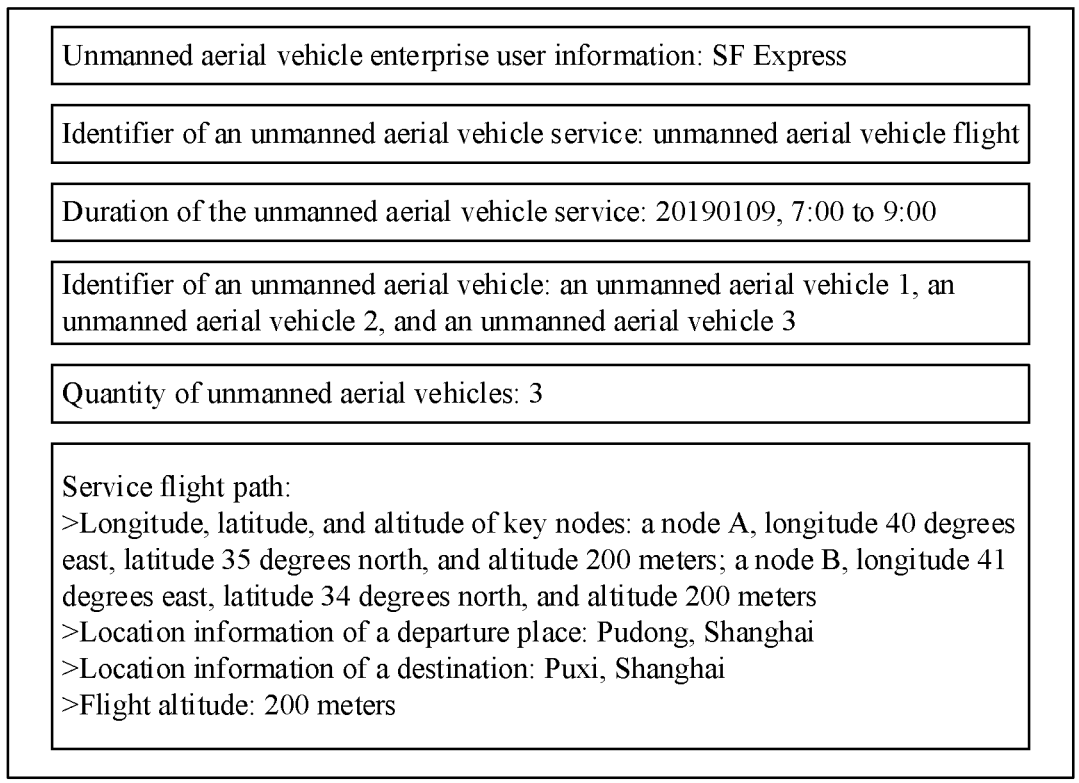
FIG. 7 is a schematic diagram of a service intent according to an embodiment of the present application.

The service intent template shown in FIG. 4 is used as an example. The intent management device describes, by using the service intent, a service to be used by the unmanned aerial vehicle. FIG. 7 shows a possible service intent. Referring to FIG. 7, the service intent generated by the intent management device includes enterprise user information (SF Express), service type information (using the identifier of the unmanned aerial vehicle service as an example, the information may be "unmanned aerial vehicle flight"), service access time information (using the duration of the unmanned aerial vehicle service as an example, the information may be "20190109, 7:00 to 9:00"), longitude, latitude, and altitude of a flight path (a node A, longitude 40 degrees east and latitude 35 degrees north; a node B longitude 41 degrees east, latitude 34 degrees north, and flight altitude 200 m), and a departure place and a destination (Pudong, Shanghai and Puxi, Shanghai).

302: The requirement device sends the service intent to the intent management device, where the service intent is used to indicate the service requirement information, and the service requirement information includes service access time information of at least one terminal device and service access location information of the at least one terminal device.

It should be noted that the requirement device may send the service intent to the intent management device, to indicate the intent management device to configure a specific network. Alternatively, after receiving the service intent, the intent management device may not configure a network, but indicate the network management device to configure the network.

Specifically, the requirement device may send the service intent to the intent management device by using an interface invocation address. The interface invocation address is an invocation address of an interface that is disposed on the intent management device and that is used to receive the service intent. For example, the interface invocation address may be a uniform resource identifier (uniform resource identifier, URI).

It should be noted that the at least one terminal device is a terminal device configured to use the service described in the service intent. The service access time information of the at least one terminal device may be the same or different.

In a possible implementation, the service requirement information may include service access time information of each terminal device, and the service access time information of each terminal device may be the same or different.

For example, five terminal devices use the service described in the service intent, and the service access time information included in the service requirement information is 1 hour, 1 hour, 2 hours, 1.5 hours, and 0.5 hours. The five pieces of time information are in a one-to-one correspondence with the five terminal devices, and a correspondence between the service access time information in the service intent and the terminal device may be pre-specified. This is not limited in this embodiment of the present application.

In a possible implementation, the service requirement information includes one piece of service access time information, and the service access time information of each terminal device is the same.

For example, five terminal devices use the service described in the service intent, and service access time information included in the service requirement information is 1 hour. The time information included in the service requirement information corresponds to the five terminal devices, that is, service access time information of each of the five terminal devices is 1 hour.

In some embodiments of the present application, the service access location information of the at least one terminal device may be the same or may be different.

In a possible implementation, the service requirement information may include service access location information of each terminal device, and the service access location information of each terminal device may be the same or different.

For example, five terminal devices use the service described in the service intent, and the service access location information included in the service requirement information is Haidian District, Chaoyang District, Dongcheng District, Xicheng District, and Changping District. The five pieces of location information are in a one-to-one correspondence with the five terminal devices, and a correspondence between the service access location information in the service intent and the terminal device may be pre-specified. This is not limited in this embodiment of the present application.

In a possible implementation, the service requirement information includes one piece of service access location information, and the service access location information of each terminal device is the same.

For example, five terminal devices use the service described in the service intent, and the service access location information included in the service requirement information is Chaoyang District. The location information included in the service requirement information corresponds to the five terminal devices, that is, service access location information of each of the five terminal devices is Chaoyang District.

303: The intent management device receives the service intent from the requirement device.

Specifically, the requirement device may send the service intent to the interface invocation address, and then the intent management device may receive the service intent sent by the requirement device. After receiving the service intent, the intent management device may perform step 304 to configure the network based on the service intent. Alternatively, step 305 may be performed to indicate the network management device to configure the network.

304: The intent management device determines network configuration information based on the service intent, and configures the network based on the network configuration information.

It should be noted that the network configuration information is used to indicate a radio resource configuration. In a possible implementation, the network configuration information includes at least one of the following: antenna configuration information, beam configuration information, cell configuration information, routing information, and status information of a network device.

The antenna configuration information is used to adjust an antenna of the network device. For example, the antenna configuration information may be an antenna angle, and the intent management device may adjust the antenna angle based on the antenna configuration information.

The beam configuration information is used to adjust a beam of the network device. For example, the beam configuration information may be an azimuth angle and a pitch angle of the beam of the network device, and the intent management device may adjust the beam of the network device based on the beam configuration information, to adjust a beam gain.

The cell configuration information is used to adjust a cell covered by the network device. The cell configuration information may be a frequency of a cell, a radio resource management policy (RRM Policy) of the cell, neighboring cell information of the cell, slice selection assistance information, and the like. The slice selection assistance information may be single network slice selection assistance information (S-NSSAI). The intent management device may configure the cell based on the cell configuration information, to provide network coverage for the service described in the service intent.

The routing information is used to adjust an interface endpoint of the network device. For example, the routing information may be an IP address of an Xn interface, an X2 interface, or an NG interface, or may be an ID of a virtual local area network (VLAN). The intent management device may adjust a route of the network device based on the routing information.

The status information of the network device includes any one of an active state, an inactive state, an available state, and an unavailable state. The intent management device may adjust a status of the network device based on the status information of the network device in the network configuration information. For example, the network device is in the inactive state, and the status information of the network device is the active state. In step 304, the intent management device may activate the network device based on the network configuration information.

305: The intent management device determines first information based on the service intent, and sends the first information to the network management device, where the first information includes network configuration information or network intent information.

In a possible implementation, the intent management device determines the network configuration information based on the service intent received from the requirement device, and sends the network configuration information to the network management device. The network management device receives the network configuration information, and configures the network based on the network configuration information. For information included in the network configuration information, refer to related descriptions in step 303. For a specific implementation in which the network management device configures the network based on the network configuration information, refer to related configuration performed by the intent management device based on the network configuration information. Details are not described herein again.

In a possible implementation, the intent management device determines the network intent information based on the service intent received from the requirement device, and sends the network intent information to the network management device. The network management device receives the network intent information, and configures the network based on the network intent information. The network intent information is used to describe an effect of a network configuration, and the network management device may configure a radio resource based on the network intent information, to achieve the effect of the network configuration described in the network intent information. For example, the service described in the service intent sent by the requirement device is a flight service of the unmanned aerial vehicle from a location A to a location B. If the intent management device determines that a currently available network cannot support the flight service of the unmanned aerial vehicle from the location A to the location B, the intent management device may generate the network intent information, to describe the effect of the network configuration as "extending a network range".

Optionally, the method shown in FIG. 3 further includes: Before step 301, the intent management device sends the service intent template to the requirement device.

Optionally, the method shown in FIG. 3 further includes: Before the intent management device sends the service intent template to the requirement device, the intent management device may further receive a service subscription request message. The service subscription request message may include at least one of a service type, a user rate, a latency, and a maximum quantity of users.

The service type is used to describe a type of a subscribed service, including an enhanced mobile broadband (eMBB) service, a massive internet of things (mIoT) service, a URLLC service, a WTTx service, an unmanned aerial vehicle flight service, an AR/VR service, and a resource tracking service.

The user rate is used to describe a network rate perceived by a user, including an uplink rate and a downlink rate, and may be a single-user rate or an average user rate.

The latency is used to describe a latency of the network.

The maximum quantity of users is used to describe a maximum quantity of terminal devices for accessing the network and using the service.

Further, the intent management device determines the service intent template based on the service subscription request message. For example, the service type is the unmanned aerial vehicle flight service, and the intent management device determines the service intent template corresponding to the unmanned aerial vehicle service. Alternatively, the service type is the URLLC service, a traffic model is the unmanned aerial vehicle flight service, and the intent management device determines the service intent template corresponding to the unmanned aerial vehicle service.

Optionally, the service subscription request message may further include second information, where the second information is used to indicate the intent management device to return the service intent template. In a current technology, after receiving the service subscription request message, the intent management device allocates a network resource to the service of the terminal device based on the service subscription request message. In some embodiments of the present application, after receiving the service subscription request message, the intent management device determines, based on the service subscription request message, the service intent template corresponding to the service of the terminal device, and may send the determined service intent template to the requirement device. In this way, the requirement device may report a real-time service requirement of the terminal device based on the service intent template, and the network resource is allocated based on the real-time service requirement. The user only needs to pay for the network resource in a service access time, thereby implementing a pay-per-use network resource scheduling mode.

Optionally, the method shown in FIG. 3 further includes: The intent management device sends the interface invocation address to the requirement device, where the interface invocation address is used to indicate the requirement device to send the service intent to the requirement device by using the interface invocation address.

In the method provided in an embodiment of the present application, the intent management device may allocate the network resource to the service of the terminal device based on the service access time information and the service access location information in the service requirement information, and the user only needs to pay for the network resource during the service access time, thereby implementing the pay-per-use network resource scheduling mode. In addition, in a period other than the service access time, the network resource may be allocated to another service, so that the network resource is properly used and network resources are not wasted.

Figure 8:
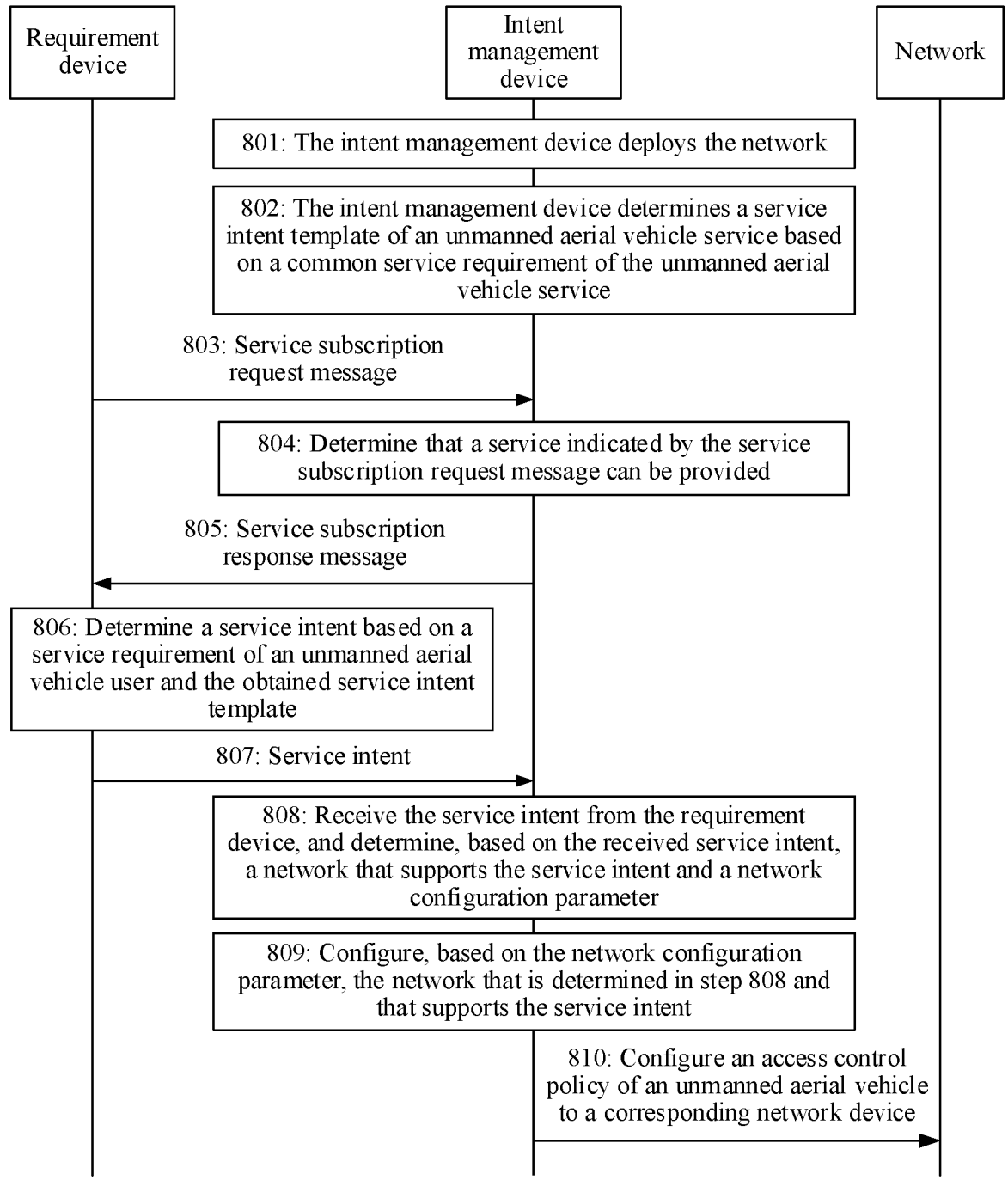
FIG. 8 is another schematic flowchart of an intent-based network configuration method according to an embodiment of the present application.

The following describes a network configuration method provided in an embodiment of the present application by using an unmanned aerial vehicle service as an example. Referring to FIG. 8, the method includes the following steps.

801: An intent management device deploys a network.

The intent management device may be an operator management system. The intent management device may deploy, based on a feature of a service, a network supporting the service. The deployed network may include a base station, a core network, a transmission network, and the like. The transmission network may be a fixed network.

The network deployed by the intent management device supports a service. For example, the network deployed by the intent management device only supports the unmanned aerial vehicle service. Certainly, the network deployed by the intent management device may also support a plurality of services. For example, the network deployed by the intent management device supports the unmanned aerial vehicle service, a VR service, and an AR service.

802: The intent management device determines a service intent template of the unmanned aerial vehicle service based on a common service requirement of the unmanned aerial vehicle service.

The service intent template of the unmanned aerial vehicle service includes service requirement information of the unmanned aerial vehicle service and constraint information of each item of service requirement information.

Referring to FIG. 4, the service requirement information included in the intent template of the unmanned aerial vehicle service may be unmanned aerial vehicle enterprise user information, an identifier of the unmanned aerial vehicle service, duration of the unmanned aerial vehicle service, an identifier of an unmanned aerial vehicle, and a service flight path.

803: A requirement device sends a service subscription request message to the intent management device.

The requirement device may be a service operation system of an enterprise user. For example, the requirement device may be an operation system of an unmanned aerial vehicle user, and may send the service subscription request message to the intent management device based on a service requirement of the unmanned aerial vehicle user. In an embodiment of the present application, the service subscription request message may include at least one of a service type, a user rate, a latency, and a maximum quantity of users.

In a possible implementation, the service subscription request message may be an allocate network (allocate network) request, and a network may be allocated to a service of the unmanned aerial vehicle user based on the service subscription request message. Alternatively, the service subscription request message is an allocate network slice (allocate NSI), and the network slice may be allocated to the service of the unmanned aerial vehicle user based on the service subscription request message.

804: The intent management device determines that a service indicated by the service subscription request message can be provided.

In a specific implementation, if the intent management device determines that the network deployed in step 801 can satisfy information in the service subscription request message, the intent management device determines that the service indicated by the service subscription request message can be provided.

Optionally, the intent management device may deploy an independent network slice instance on the network deployed in step 801, to satisfy the service indicated by the service subscription request message.

It should be noted that, after determining that the service indicated by the service subscription request message can be provided, the intent management device may determine the service intent template of the unmanned aerial vehicle service. That is, step 802 may be included in step 804.

805: The intent management device returns a service subscription response message to the requirement device.

The service subscription response message carries the service intent template and an interface invocation address of the unmanned aerial vehicle service. The interface invocation address is used by the requirement device to send the service intent to the intent management device, and the intent management device may receive, by using the interface invocation address, a service requirement sent by the requirement device.

In a possible implementation, the interface invocation address may be an IP address or a URI.

806: The requirement device determines the service intent based on the service requirement of the unmanned aerial vehicle user and the obtained service intent template.

In a specific implementation, the requirement device fills a specific value of the service intent template based on the service requirement of the unmanned aerial vehicle user and with reference to the constraint information of the service requirement information, to generate the service intent.

For example, the service intent includes: enterprise user information (SF Express), service type information (unmanned aerial vehicle flight), service access time information (20190109, 7:00 to 9:00), longitude, latitude, and altitude of a flight path (a node A, longitude 40 degrees east and latitude 35 degrees north; a node B, longitude 41 degrees east, latitude 34 degrees north, and flight altitude 200 m), and a departure place and a destination (Pudong, Shanghai and Puxi, Shanghai).

807: The requirement device sends the service intent to the intent management device.

Specifically, the service intent is sent to the intent management device by using the interface invocation address.

808: The intent management device receives the service intent from the requirement device, and determines, based on the received service intent, a network that supports the service intent and a network configuration parameter.

Specifically, a core network function instance that supports the service intent may be determined, for example, a user plane function (user plane function, UPF) instance that can satisfy the service intent may be determined. Alternatively, an access network function that supports the service intent may be determined, for example, a base station, a cell, an antenna, and the like that support the service intent may be determined.

Further, after the network that supports the service intent is determined, the network configuration parameter required for configuring the network may be further determined. The network configuration parameter may be a configuration parameter related to an antenna of the base station, for example, an angle of the antenna of the base station. The network configuration parameter may alternatively be a parameter related to a beam of the base station, and includes an azimuth angle of the beam, a pitch angle of the beam, transmit power of the beam, and the like.

Optionally, in this step, the intent management device may also determine an access control policy of a corresponding terminal (for example, an unmanned aerial vehicle) that uses a service described in the service intent.

809: The intent management device configures, based on the network configuration parameter, the network that is determined in step 808 and that supports the service intent.

Specifically, the intent management device may activate or deactivate some network devices based on the network configuration parameter, or may adjust configurations of some network devices based on the network configuration parameter, for example, adjust an antenna angle of the base station, a pitch angle of a transmit/receive beam of the base station, an azimuth angle of the transmit/receive beam of the base station, and transmit power of a transmit beam of the base station.

Optionally, the intent management device may also send the network configuration parameter to a network management device herein, to request the network management device to configure the network based on the network configuration parameter.

810: The intent management device configures an access control policy of the unmanned aerial vehicle to a corresponding network device.

The unmanned aerial vehicle is a terminal device configured to use the service described in the service intent. In a specific implementation, the intent management device may send the access control policy of the unmanned aerial vehicle to a policy control function (PCF) network element, or may send the access control policy of the unmanned aerial vehicle to a network slice selection function (NSSF) network element, or may send the access control policy of the unmanned aerial vehicle to a network data analytics function (NWDAF) network element.

Optionally, the intent management device may alternatively request the network management device to configure a PCF/an NSSF/an NWDAF for the access control policy of the unmanned aerial vehicle.

In the method provided in some embodiments of the present application, service intent templates for different services are provided, so that the operator management system can propose the service intent based on the intent template and a real-time service requirement of the enterprise user, the operator management system can adjust and schedule the network in real time to guarantee the service, and the enterprise user only needs to pay according to an actual traffic requirement. This improves user experience and reduces a waste of network resources to some extent.

Figure 9:
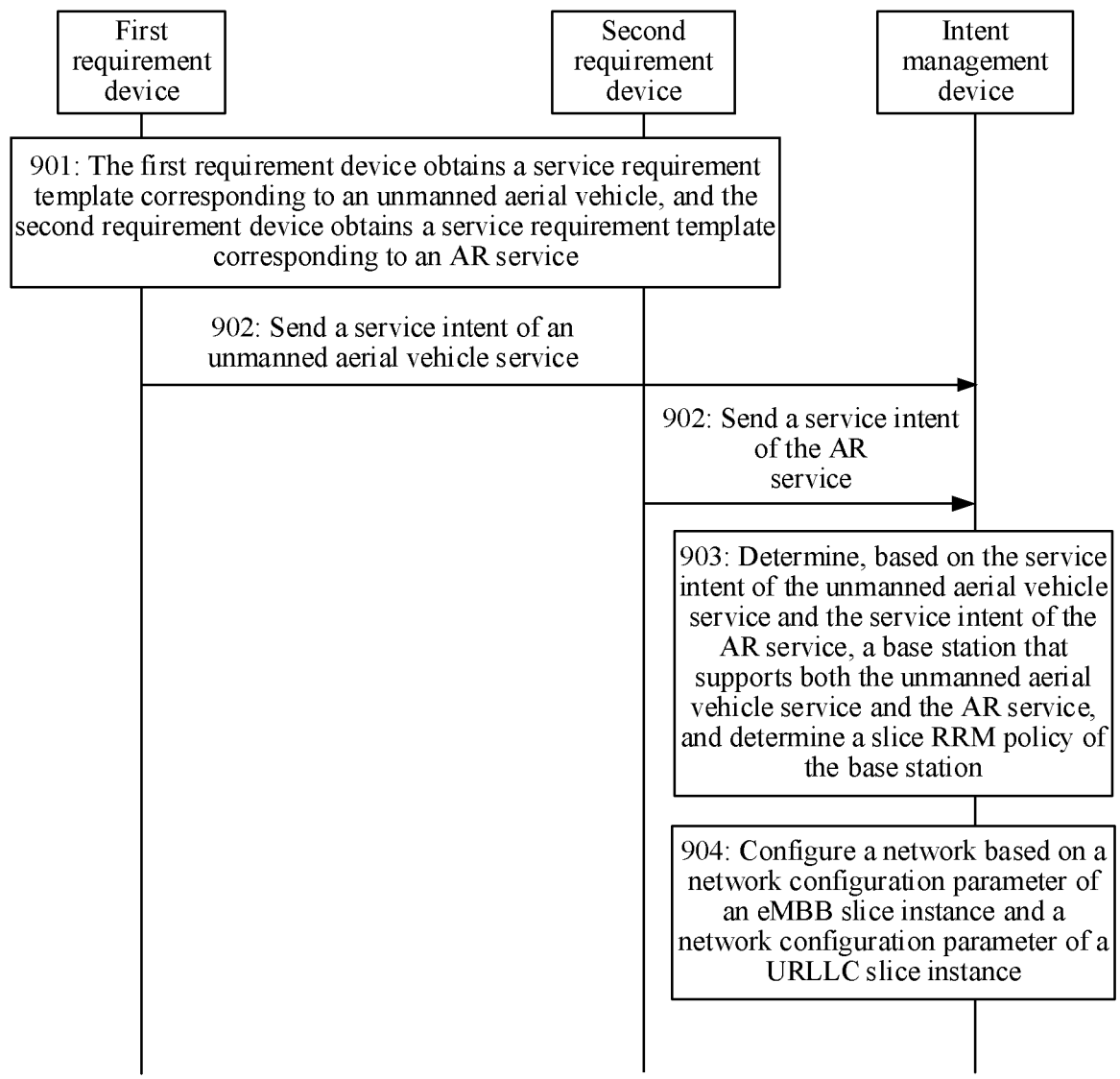
FIG. 9 is another schematic flowchart of an intent-based network configuration method according to an embodiment of the present application.

In a 5G communication system, a scenario in which different network slice instances share a network resource exists, and different network slice instances are used to support different types of services. It is assumed that a base station is shared by a URLLC network slice instance and an eMBB network slice instance. The URLLC network slice instance is used to support an unmanned aerial vehicle flight service, and the eMBB network slice instance is used to support an AR service. An embodiment of the present application further provides a network configuration method, to implement a pay-per-use network resource scheduling mode in this scenario. As shown in FIG. 9, the method includes the following steps.

901: A first requirement device obtains a service requirement template corresponding to an unmanned aerial vehicle, and a second requirement device obtains a service requirement template corresponding to an AR service.

It should be noted that the first requirement device may be a service operation system of an unmanned aerial vehicle enterprise, and the second requirement device may be a service operation system of an AR enterprise. In addition, for a specific manner in which the first requirement device and the second requirement device obtain the service requirement template, refer to step 801 to step 805. Details are not described herein again.

902: The first requirement device sends a service intent of an unmanned aerial vehicle service to an intent management device, and the second requirement device sends a service intent of the AR service to the intent management device.

In a specific implementation, the first requirement device fills a specific value of a service intent template of the unmanned aerial vehicle service based on a service requirement of an unmanned aerial vehicle user and with reference to constraint information of service requirement information, to generate the service intent of the unmanned aerial vehicle service. The second requirement device fills a specific value of a service intent template of the AR service based on a service requirement of an AR user and with reference to the constraint information of the service requirement information, to generate the service intent of the AR service.

In addition, the intent management device may further send an interface invocation address to the first requirement device, and the first requirement device may send the service intent of the unmanned aerial vehicle service to the intent management device by using the interface invocation address.

The intent management device may further send an interface invocation address to the second requirement device, and the second requirement device may send the service intent of the AR service to the intent management device by using the interface invocation address.

It should be noted that the interface invocation addresses sent by the intent management device to the first requirement device and the second requirement device may be the same or may be different. This is not limited in this embodiment of the present application.

903: The intent management device determines, based on the service intent of the unmanned aerial vehicle service and the service intent of the AR service, a base station that supports both the unmanned aerial vehicle service and the AR service, and determines a slice RRM policy of the base station.

It should be noted that determining the slice RRM policy of the base station is determining, in network resources that can be used by the base station, a proportion of network resources that can be used by an eMBB slice instance to network resources that can be used by a URLLC slice instance.

In addition, the intent management device may determine, based on the service intent of the unmanned aerial vehicle service and a proportion of network resources occupied by the URLLC slice instance, a network configuration parameter corresponding to the URLLC slice instance. For example, if 10 terminal devices need to use a service provided by the URLLC slice instance, and two terminal devices need to use a service provided by the eMBB slice instance, network resources need to be configured, that is, a large part of the network resources are allocated to the URLLC slice instance, and a small part of the network resources are allocated to the eMBB slice instance.

The intent management device may further determine, based on the service intent of the AR service and a proportion of network resources occupied by the eMBB slice instance, a network configuration parameter corresponding to the eMBB slice instance.

904: The intent management device configures a network based on the network configuration parameter of the eMBB slice instance and the network configuration parameter of the URLLC slice instance.

In a specific implementation, the intent management device first activates the base station that is determined in step 903 and that supports both the unmanned aerial vehicle service and the AR service.

Further, the network may be configured based on the network configuration parameter of the eMBB slice instance, for example, by adjusting an antenna parameter and a beam parameter of the base station. Certainly, the network may alternatively be configured based on the network configuration parameter of the URLLC slice instance, for example, by adjusting an antenna parameter and a beam parameter of the base station. It should be noted that an antenna adjusted based on the network configuration parameter of the eMBB slice instance and an antenna adjusted based on the network configuration parameter of the URLLC slice instance may be the same or may be different. This is not limited herein.

For example, if there is only an unmanned aerial vehicle flight service at a moment, an antenna or a beam of the base station needs to be configured to be upward. If there is only the AR service at a moment, an antenna or a beam of the base station needs to be configured to be downward.

Optionally, the intent management device may also request the network management device to activate a corresponding base station and configure a corresponding network.

In the method provided in some embodiments of the present application, in a scenario in which different network slice instances share a network resource, the network can be adjusted and scheduled in real time based on service intents supported by different network slices to guarantee the service, and an enterprise user only needs to pay according to an actual traffic requirement, thereby improving user experience and reducing a waste of network resources to some extent.

Figure 10:
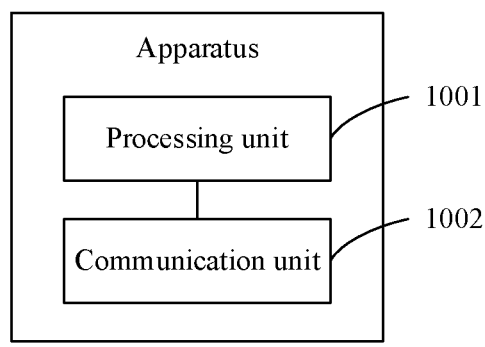
FIG. 10 is another structural block diagram of an apparatus according to an embodiment of the present application.

FIG. 10 is a possible schematic diagram of a structure of the apparatus in the foregoing embodiments. The apparatus shown in FIG. 10 may be the intent management device described in the embodiments of this application, or may be a component that implements the foregoing method and that is in the intent management device, or may be a chip used in the intent management device. The chip may be a system-on-a-chip (SOC), a baseband chip with a communication function, or the like. As shown in FIG. 10, the apparatus includes a processing unit 1001 and a communication unit 1002. The processing unit may be one or more processors, and the communication unit may be a transceiver.

The processing unit 1001 is configured to support the apparatus in performing step 303, step 304, step 801, step 802, step 804, step 808, step 809, step 903, and step 904, and/or another process of the technology described in this specification.

The communication unit 1002 is configured to support communication between the apparatus and another apparatus, for example, support the apparatus in performing step 302, step 305, step 803, step 805, step 807, step 810, and step 902 in the foregoing embodiments, and/or another process of the technology described in this specification. The processing unit 1001 may send and receive information by using the communication unit 1002.

It should be noted that all related content of the steps in the foregoing method embodiments may be cited in function descriptions of corresponding function modules. Details are not described herein again.

Figure 11:
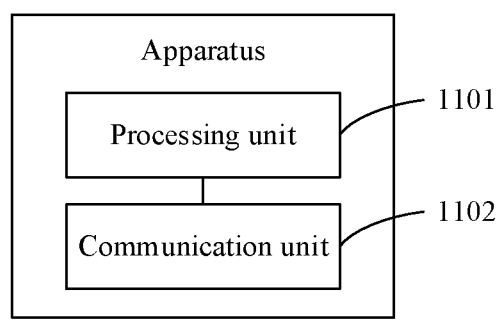
FIG. 11 is another structural block diagram of an apparatus according to an embodiment of the present application.

FIG. 11 is a possible schematic diagram of a structure of the apparatus in the foregoing embodiments. The apparatus shown in FIG. 11 may be the requirement device described in the embodiments of this application, or may be a component that implements the foregoing method and that is in the requirement device, or may be a chip used in the requirement device. The chip may be a system-on-a-chip (SOC), a baseband chip with a communication function, or the like. As shown in FIG. 11, the apparatus includes a processing unit 1101 and a communication unit 1102. The processing unit may be one or more processors, and the communication unit may be a transceiver.

The processing unit 1101 is configured to support the apparatus in performing step 301, step 806, and step 901, and/or another process of the technology described in this specification.

The communication unit 1102 is configured to support communication between the apparatus and another apparatus, for example, support the apparatus in performing step 302, step 803, step 805, step 807, and step 902 in the foregoing embodiments, and/or another process of the technology described in this specification. The processing unit 1101 may send and receive information by using the communication unit 1102.

It should be noted that all related content of the steps in the foregoing method embodiments may be cited in function descriptions of corresponding function modules. Details are not described herein again.

The foregoing descriptions about implementations allow a person skilled in the art to understand that, for the purpose of convenient and brief description, division of the foregoing function modules is used as an example for illustration. In actual application, the foregoing functions can be allocated to different function modules and implemented according to a requirement, that is, an inner structure of a database access apparatus is divided into different function modules to implement all or some of the functions described above.

In the several embodiments provided in this application, it should be understood that the disclosed database access apparatus and method may be implemented in other manners. For example, the described database access apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An intent-based network configuration method, comprising:
   receiving, by an intent management device, a service intent from a requirement device, wherein the service intent indicates service requirement information, and the service requirement information comprises service access time information of at least one terminal device and service access location information of the at least one terminal device; and
   determining, by the intent management device, network configuration information based on the service intent, and configuring a network based on the network configuration information, or
   determining, by the intent management device, first information based on the service intent, and sending the first information to a network management device, wherein the first information comprises the network configuration information or network intent information,
   the network configuration information indicates a radio resource configuration, and the network intent information describes an effect of a network configuration.

2. The method according to claim 1, wherein the method further comprises:
   sending, by the intent management device, a service intent template to the requirement device, wherein the service intent template indicates at least one of format information of the service intent and constraint information of the service intent, the format information of the service intent indicates the service requirement information supported by the service intent, or the constraint information of the service intent indicates a range of the service requirement information supported by the service intent.

3. The method according to claim 2, wherein before the sending, by the intent management device, a service intent template to the requirement device, the method further comprises:
   receiving, by the intent management device, a service subscription request message, wherein the service subscription request message comprises at least one of a service type, a user rate, a latency, or a maximum quantity of users; and
   determining, by the intent management device, the service intent template based on the service subscription request message.

4. The method according to claim 3, wherein the service subscription request message further comprises second information, wherein the second information indicates the intent management device to return the service intent template.

5. The method according to claim 1, wherein the method further comprises:
   sending, by the intent management device, an interface invocation address to the requirement device, wherein the interface invocation address indicates the requirement device to send the service intent to the intent management device by using the interface invocation address.

6. The method according to claim 1, wherein the service access time information comprises at least one of the following information: service access start time information, service access end time information, a service access periodicity, or service access duration.

7. The method according to claim 1, wherein the service access location information comprises longitude and latitude information and/or service access area information that are/is related to a service access path.

8. The method according to claim 1, wherein the service intent comprises at least one of the following: service type information, tenant information, an identifier of a terminal device, a quantity of terminal devices, or a service intent priority.

9. The method according to claim 1, wherein the network configuration information comprises at least one of the following: antenna configuration information, beam configuration information, cell configuration information, routing information, or status information of a network device.

10. An intent management device, comprising:
    a memory configured to store a computer program; and
    a processor coupled to the memory, wherein the computer program causes the processor to be configured to:
    receive a service intent from a requirement device, wherein the service intent indicates service requirement information, and the service requirement information comprises service access time information of at least one terminal device and service access location information of the at least one terminal device; and
    determine network configuration information based on the service intent and configure a network based on the network configuration information, or determine first information based on the service intent and send the first information to a network management device, wherein the first information comprises the network configuration information or network intent information, the network configuration information indicates a radio resource configuration, and the network intent information describes an effect of a network configuration.

11. The intent management device according to claim 10, wherein the service access time information comprises at least one of the following: service access start time information, service access end time information, a service access periodicity, or service access duration.

12. The intent management device according to claim 10, wherein the service access location information comprises longitude and latitude information and/or service access area information that are/is related to a service access path.

13. The intent management device according to claim 10, wherein the service intent comprises at least one of the following: service type information, tenant information, an identifier of a terminal device, a quantity of terminal devices, or a service intent priority.

14. The intent management device according to claim 10, wherein the network configuration information comprises at least one of the following: antenna configuration information, beam configuration information, cell configuration information, routing information, or status information of a network device.

15. The intent management device according to claim 10, wherein the processor is further configured to send a service intent template to the requirement device, wherein the service intent template indicates at least one of format information of the service intent and constraint information of the service intent, the format information of the service intent indicates the service requirement information supported by the service intent, or the constraint information of the service intent indicates a range of the service requirement information supported by the service intent.

16. The intent management device according to claim 15, wherein the processor is further configured to: receive a service subscription request message, wherein the service subscription request message comprises at least one of a service type, a user rate, a latency, or a maximum quantity of users; and determine the service intent template based on the service subscription request message.

17. The intent management device according to claim 16, wherein the service subscription request message further comprises second information, wherein the second information indicates the intent management device to return the service intent template.

18. The intent management device according to claim 10, wherein the processor is further configured to send an interface invocation address to the requirement device, and the interface invocation address indicates the requirement device to send the service intent to the intent management device by using the interface invocation address.

19. An intent-based network configuration method, comprising:

generating, by a requirement device, a service intent based on a service intent template, and sending the service intent to an intent management device, wherein the service intent indicates service requirement information, and the service requirement information comprises service access time information of at least one terminal device and service access location information of the at least one terminal device; and receiving, by the intent management device, the service intent from the requirement device, determining network configuration information based on the service intent, and configuring a network based on the network configuration information; or receiving the service intent from the requirement device, determining first information based on the service intent, and sending the first information to a network management device, wherein the first information comprises the network configuration information or network intent information, the network configuration information indicates a radio resource configuration, and the network intent information describes an effect of a network configuration.

\* \* \* \* \*